No. 740,245. PATENTED SEPT. 29, 1903.
G. W. CRANE.
SHREDDER FEEDER.
APPLICATION FILED APR. 7, 1902.
NO MODEL.

WITNESSES:
Edw. Thorpe
C. R. Ferguson

INVENTOR
George W. Crane
BY
ATTORNEYS

No. 740,245. Patented September 29, 1903.

UNITED STATES PATENT OFFICE.

GEORGE W. CRANE, OF VEEDERSBURG, INDIANA.

SHREDDER-FEEDER.

SPECIFICATION forming part of Letters Patent No. 740,245, dated September 29, 1903.

Application filed April 7, 1902. Serial No. 101,693. (No model.)

*To all whom it may concern:*

Be it known that I, GEORGE W. CRANE, a citizen of the United States, and a resident of Veedersburg, in the county of Fountain and State of Indiana, have invented a new and Improved Shredder-Feeder, of which the following is a full, clear, and exact description.

This invention relates to improvements in devices for feeding corn to shredding-machines; and the object is to provide a feeder of simple construction that will obviate the necessity of a person placing his hands near the shredding devices, thus avoiding accidental cutting or injury to the hands.

I will describe a shredder-feeder embodying my invention and then point out the novel features in the appended claims.

Reference is to be had to the accompanying drawings, forming a part of this specification, in which similar characters of reference indicate corresponding parts in both figures.

Figure 1:
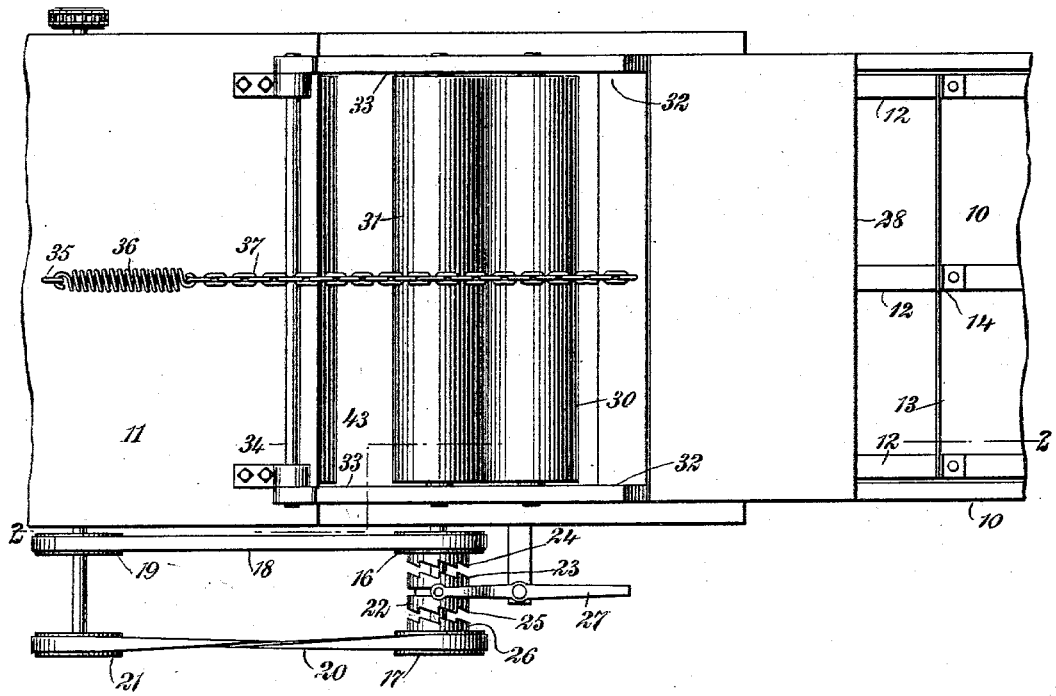
Figure 2:
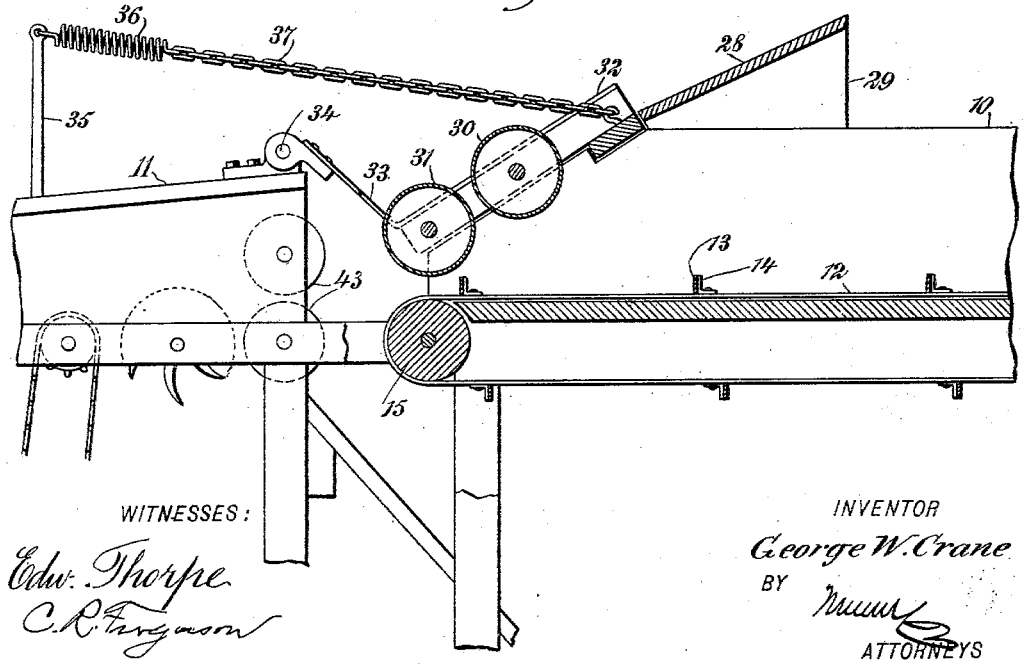

Figure 1 is a plan view of a shredder-feeder embodying my invention. Fig. 2 is a section on the line 2 2 of Fig. 1.

Referring first to the example of my improvement shown in Figs. 1 and 2, 10 designates a runway leading from a stack or load of corn-fodder and designed to discharge into the shredder 11, which is of the ordinary construction and need not be fully disclosed herein. The material is carried along in this instance by means of an endless carrier consisting of bands 12, to which the cross-slats 13 are connected at intervals. These cross-slats preferably consist of metal, so that they may be made quite thin and still have sufficient strength, and as a convenient means for securing the same to the belts I employ L-shaped irons 14, the slats being secured to one member, while the other member is secured to the belt. At the outlet end the carrier passes over an actuating-roller 15. At some times it is necessary to change the direction of movement of the carrier. For this purpose the shaft of the roller 15 is provided with two pulleys 16 17. The pulley 16 has band connection 18 with a pulley 19 on a shaft of the shredding mechanism, and the pulley 17 has a cross-band connection 20 with a pulley 21 on said shredder-shaft. The pulleys 16 and 17 are loose on the shaft of the roller, and to place the pulleys into operative connection with the shaft I employ a clutch member 22, mounted to slide on the shaft, but adapted for rotary movement therewith. This clutch member 22 has clutching-teeth 23 at one side designed for engagement with the clutching-teeth 24 on the pulley 16, and on its opposite side the clutch member 22 has teeth 25 for engaging with clutch-teeth 26 on the pulley 17. By this arrangement it is obvious that by placing the pulley 16 into clutch engagement with the roller-shaft the said roller will be rotated to move the carrier forward. If a backward movement is desired, the clutch member 22 may be quickly shifted by means of a lever 27 into engagement with the pulley 17. When it is desired to stop the carrier or the feeding mechanism while the shredder still continues to operate, the clutch member 22 may be moved to a central position, as clearly indicated in Fig. 1.

Extended across the upper side of the runway near its outlet end is a downwardly and forwardly inclined deflector-board 28. This deflector-board 28 is connected to the side boards of the runway by side pieces 29 and presses or forces the stalks downward as carried along by the endless carrier and directs the same to the rollers 30 and 31. These rollers have journal-bearings in a frame 32, which in its normal position is inclined downward and forward, so that the roller 30, which may be termed the "packing-roller," will be on a slightly-higher plane than the feeding-roller 31. The frame 32 has arms 33 connected to it, and these arms are inclined forward and upward and have swinging connection on a rod 34, mounted on the top of the shredder-casing.

From a standard 35 on the shredder-casing there is a spring 36 and chain 37 connection with the frame 32. By this arrangement the frame carrying the rollers is permitted a slight vertical movement, and it may be adjusted as to its inclination by changing the connection of a link of the chain 37 with a hook on the spring or a hook on the frame. Also by means of this chain the frame carrying the rollers 30 and 31 may be swung back onto the top of the shredder-casing when the machine is not in use or for transportation.

In the operation of the machine the fodder is carried along by the endless carrier and passed by the feeding mechanism to the snapping-rolls 43, and from these rolls the fodder is passed to the shredder mechanism and thence is carried off in the usual manner to a place of storage.

It is obvious that in a feeder embodying my invention all danger to an attendant is practically obviated and the material may be fed evenly and continuously to the shredder. When not in use, the feeding mechanism may be readily removed and packed in parts of the machine. If desired, the several rollers of the feeder may be made of sheet metal suitably braced on the inner side, or it is obvious that they may be made of wood.

Having thus described my invention, I claim as new and desire to secure by Letters Patent—

1. A shredder-feeder comprising a runway, a deflector-board at the outlet end of the runway, a frame mounted to swing relatively to said board, rollers mounted in said frame, one roller being on a higher plane than the other, a yielding connection between the frame and shredder, an endless carrier, a roller around which said carrier passes, means for rotating said roller and means for changing the direction of rotation of said roller.

2. The combination with a shredder and a runway of a frame, rollers mounted in said frame, arms extended from said frame and pivoted to the shredder, a standard on the shredder, and a yielding connection between said frame and standard.

In testimony whereof I have signed my name to this specification in the presence of two subscribing witnesses.

GEORGE W. CRANE.

Witnesses:
JAMES SIMPSON,
JOHN P. HARTMAN.